Aug. 19, 1958  E. SANTONI  2,847,906
PHOTOGRAMMETRIC PLOTTING APPARATUS
Filed Jan. 11, 1956
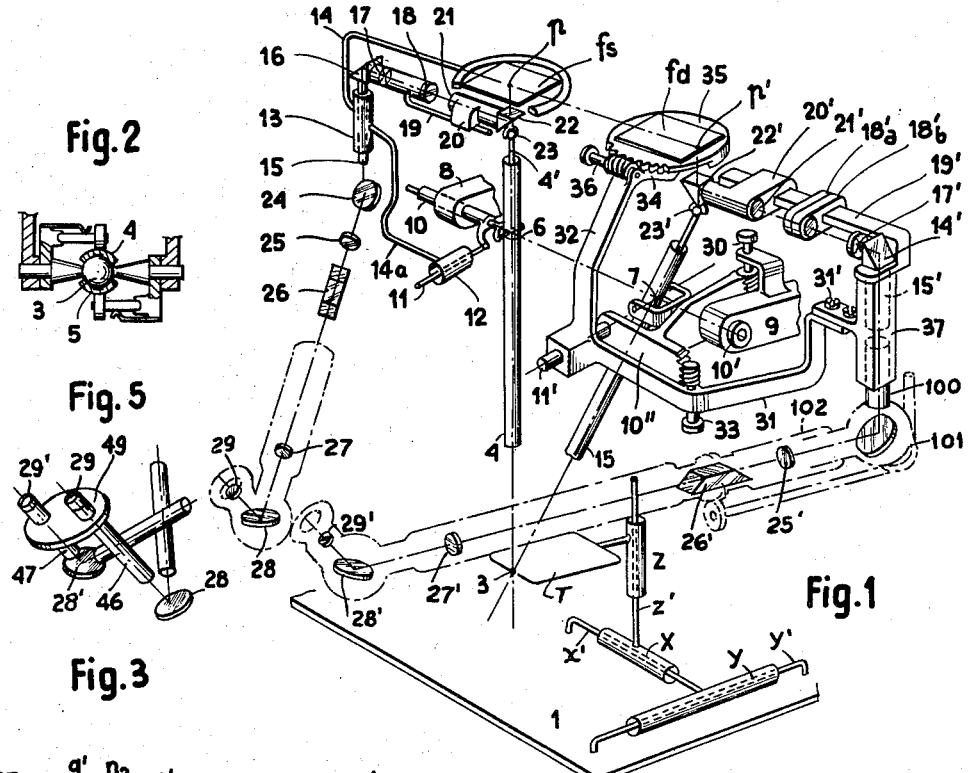
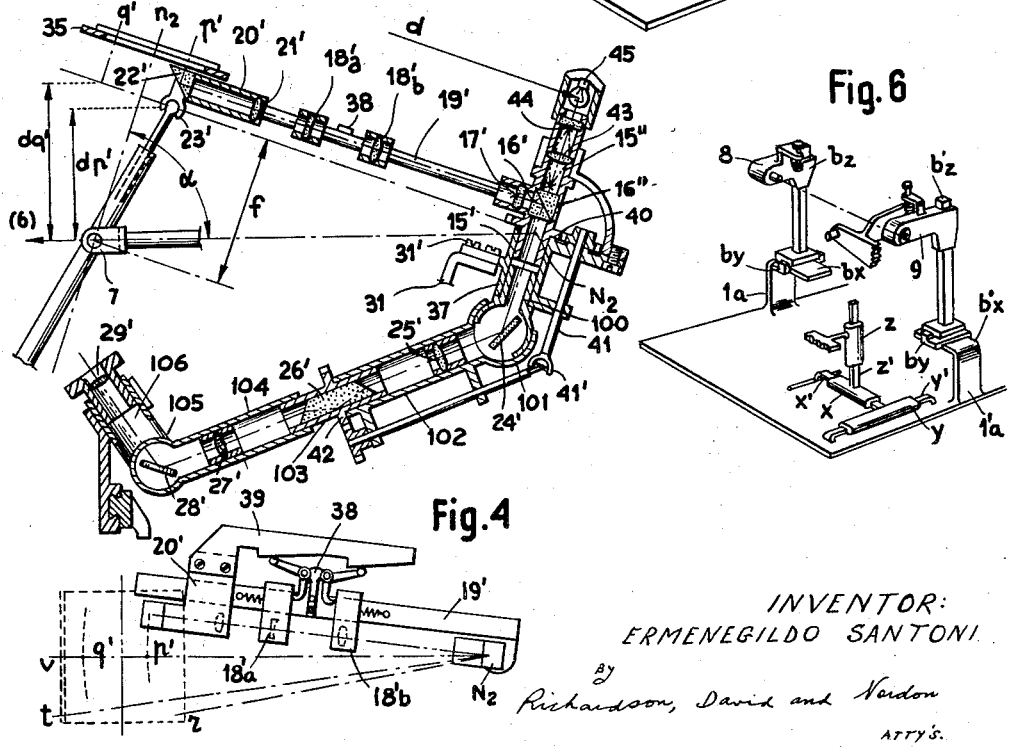
INVENTOR:
ERMENEGILDO SANTONI
by Richardson, David and Nordon
ATTYS.

2,847,906
PHOTOGRAMMETRIC PLOTTING APPARATUS

Ermenegildo Santoni, Florence, Italy

Application January 11, 1956, Serial No. 558,564

Claims priority, application Italy January 13, 1955

2 Claims. (Cl. 88—29)

The invention relates to a photogrammetric plotting apparatus and more particularly to an apparatus which has the purpose of effecting the plotting of pairs of photograms executed either with approximately mutually parallel axes or highly convergent axes.

With reference to the three known categories of plotting apparatus with the totally optical projection, with the mechanical optical projection and the totally mechanical projection respectively, it belongs to the last category. As it is known, in this category of instruments, the collimation to the various points of the photograms is directly effected through microscopes provided with collimation marks, that is, without recurring—as in other categories—to cameras similar to the shooting cameras provided with objectives having equivalent focal lengths. Consequently in the mechanical projection instruments, the images which are formed in the field of the observation ocular lens are always in a constant ratio with respect to those resulting in the original photograms, which usually forms an advantage with respect to the instruments of the second category and also, at least to some types of instruments of the first category.

The direct observation of the two photograms as it occurs in the mechanical projection instruments does not therefore provide any particular difficulty in regards to the stereoscopic observation when it is desired to slot a pair of photograms with the axes approximately parallel, both aerial nadiral and oblique or terrestrial. In fact, the original scale of the aerial nadiral photograms is approximately the same in each part thereof, while for the pairs of terrestrial photograms, the high variations of scale are common to the zones of the two photograms corresponding to the same zones of the object, that is, of the ground. When, on the contrary, for instance, for aerial photograms, the convergence of the shooting axes is 10–15° or if it exceeds 30°, the difference of scale in the two photograms for the same zone of ground appearing in the field of the ocular lens highly exceeds the physiological tolerance, so that the stereoscopic function of the two images is impossible. To render the same functions more difficult, there is the mutual disorientation of the two partial images, variable in amount and sign with the variation of the zones observed in the photograms.

It is an object of the invention to provide a mechanical projection plotting apparatus wherein through a new original arrangement of members and the introduction of new members having particular functions, it is possible to obtain an easy stereoscopic vision with highly convergent axis photograms.

An additional object of the invention is to provide the obtainment of a more simplified apparatus with respect to other known mechanical projection apparatus.

The invention contemplates, in a plotting apparatus of the type described, a pair of guide rods for effecting the orientation of a pair of homologue lines of vision, said rods being universally hinged in two points representing the exposure points and the cardans being connected to two boxes or the like which replace the cameras, on which the two photographs to be used are mounted. There is provided a coupling carriage for the two rods in the point designed to reproduce the point which materialises the plotted object according to an effective point of intersection of the two rods or by means of the interposition of a parallelogram, said carriage being movable according to the components X, Y, Z; an observation binocular system formed by two microscopes, each ending near the respective photograph with a movable portion carried by a slide which is connected, through a ball joint or the like, to the suitably elongable free end of the guide rod, moreover said slide being slidable along a prismatic guide or the like parallel to the photograph and said slide being pivotable around an axis parallel to the axis of the camera, the whole generically conformable to what is already known in the matter. According to the invention, the apparatus is mainly distinguished by the fact that the axis of rotation of the two prismatic guides, instead of being located as in the known devices in two planes normal to the line connecting the cardans of the guide rods and at an arbitrary distance therefrom, are located in planes passing through the line connecting said cardans, one on the opposite side of the other with respect to said line, and each at a determined distance ($d$) from the respective cardan, the value of said distance ($d$) being substantially given by the formula:

$$d = f \tang.\alpha$$

where $f$ is the focal length of the camera and $\alpha$ is the angle ($\alpha < 90°$) formed by the axis of the camera with the line connecting said cardanic centres; it is obtained in this way that each prismatic guide is located parallel to the trace of the epipolar plane corresponding to the collimated point on the photograph; the rotation of said guide is also appropriately transmitted in the ratio 1:½, by means of gears or the like, to an Amici prism interposed in the optical path, for the purpose of keeping the two images in the ocular lens in the correct reciprocal orientation; and finally in the optical path, preferably in the portion of variable length parallel to the prismatic guide, there is interposed a system of two lens, one negative and the other positive, the relative and absolute position of said two lens being automatically varied by a suitable system of levers and cams, the whole driven by the same sliding of the slide carrying the movable portion of the optical system along the prismatic guide, so that the magnification of each microscope for each position of the slide may result appropriately varied for the purpose of balancing the difference of size of two images of a same object on the two photographs, said differences being caused by the obliquity of the exposures with respect to the line connecting the exposure points. Thus in this way a suitable stereoscopic observation is attained, necessary to gain the maximum result from the two photographs, both in relation to the accuracy and to the practical efficiency.

The same apparatus furthermore allows a fixing of the two elements, negative and positive of the optical system in a determined position, otherwise designed to the variation of magnification, so as to obtain the condition, whereby the portion of variable length of the optical path is actuated in parallel beams, this allowing the microscope to preserve a constant magnification; this has the purpose of also using the apparatus for pairs of photographs shot with the axes being approximately parallel.

The already described characteristic arrangement of the axes of rotation of the prismatic guides, according to which they cut the projection, in the two opposite directions respectively, of the line connecting the cardanic centres of the guide rods, besides a particular arrangement of the collimating mark in the portion of the optical axis parallel to the prismatic guide, in proximity of the prism which sends it back according to the axis of rotation of said slide or guide, allow, in every case, to obtain, in respect to the known plotting apparatus of the same type (provided with a stationary plate and a movable optical system) a remarkable simplification in the remaining optical path to the ocular lens. This remaining optical path has the sole function of bringing the image of the mark and of the portion of photograph containing the collimated point to the ocular, without, therefore, any need for correction or adjustment. It may be actuated, for example, by an already known arrangement adopted for the plotting apparatus of different type (provided with a movable plate and a stationary optical system), this arrangement being formed by a pivotable mirror provided with a differential mounting, an elongatable tube containing two objectives and an Amici prism between them (the same which in the object of the present invention is automatically rotated for the already described functions), a second pivotable mirror and finally the observation ocular lens.

An additional improvement is obtained in the last portion of the now described optical system, orienting the path between the last mirror and the ocular lens, instead of having an equal length for the two microscopes as it is effected in the known device, by providing an appropriately different length so as to allow, through a pivotable support of the two ocular lens, the crossing of the two optical paths for the purpose of allowing the observation of the left hand photogram by the right hand eye and vice versa in order to produce the known process of concatenation of a series of successive photographs.

The drawing shows some embodiments of the invention. In said drawing:

Fig. 1 is a partly diagrammatic perspective assembly view;

Fig. 2 is a section of the details of the coupling of the guide rods to the carriage, according to known arrangements;

Fig. 3 is a side section of the apparatus limited to the most characteristic members connected to one of the photograms;

Fig. 4 is a partial plan view of the members of Fig. 3;

Fig. 5 is a partial diagrammatic view of an arrangement of the observation ocular lens; and Fig. 6 is a partly diagrammatic perspective view, similar to Fig. 1, showing additional details of the supporting structure for the supporting arms.

Referring to the drawings in detail, the apparatus of the present invention includes a base 1 which supports a system of three carriages Y, X, Z, which are movable along appropriate orthogonal guides or ways X' and y' secured to the support 1, and z' secured to x. The third carriage z supports, by means of a frame T, the joint 3 coupling the two guide rods 4 and 5 supported by the cardans 6 and 7. Said cardans are carried by arms 8 and 9. The laterally extending arms 8 and 9 are slidable on the upstanding supports bz and b'z which are carried in spaced relation by the inwardly directed inverted ⊥ shaped members, 1a and 1'a mounted on the platform. It will be observed that through the medium of the slidable supports by and b'y on the members bx and b'x and the slidable members thereon carrying the upstanding supports bz and b'z, the arms 8 and 9 are movable in three orthogonal directions. It is therefore possible to fix the spatial position of the two points of exposure, represented by the cardans 6 and 7 in a predetermined scale.

Fig. 2 shows, as an example, an already known direct coupling arrangement of the two guide rods 4 and 5 in the point 3, each of the guide rods being formed in this case by a hollow cylindrical sector. The point of connection 3 may also be divided in two points, as usually effected, by adding a parallelogram to the theoretical triangle of intersection 6, 7 and 3, so as to transform it into a linked trapezium, as illustrated, for example, in U. S. Patent Number 2,574,123.

The apparatus is composed by two symmetric portions, of which the left hand one is represented in a diagrammatic way in Fig. 1.

The arm 8 holds a tubular axle 10 wherein the primary axis of the cardan 6 is housed. The tubular axle 10 supports the axle 11, which is housed in the sleeve 12. This sleeve, through a bent arm 14a, holds the sleeve 13 and the latter, through the arm 14, supports the photogram fs. A tubular axle 15 is housed in the sleeve 13 and said axle supports the prism 16, the mark 17, the objective 18 and the guide 19. The slide 20, which supports the objective 21, the prism 22 and the ball joint 23, may slide along the guide 19. The ball joint 23 is designed for the mechanical connection with the slidable end portion 4' of the guide rod 4, said end portion 4' is axially slidable with respect to the guide rod 4.

The movements X, Y, Z of the joint 3 induce polar movements in the rod 4 and 4', around the cardan 6, the rod 4—4' on its turn determines the sliding of the slide 20 along the guide 19 (which varies the distance between the optical sets 16, 17 and 18 and 21 and 22), besides the rotation of said sets together with the guide 19 around the tubular axle 15.

The centre of the ball joint 23 therefore describes a plane, wherein the image fs ought to be theoretically situated. The optical axis of collimation, according to the path of the light, departs from the generic point p of the photogram, proceeds normal thereto, is deviated by the prism 22 in a direction parallel to the guide 19, then is furthermore deviated by the prism 16 according to the axis of the tube 15, then reflected in the mirror 24, through the Amici prism 26, then is reflected on the mirror 28 to arrive at the ocular lens 29.

The lenses required for the conveying of the image are according to the same order: the lens 21, whose focal length is equivalent to the path p—22—21—, whereby the image of the photogram is projected in parallel beams towards the lens 18; said lens 18, whose focal length corresponds to the path between said lens and the collimating mark 17, whereby the image of a portion of the photogram with the collimated point p is formed in correspondence of the mark 17; the objective 25 whose focal length is equivalent to the path —25—24—16—17—, whereby it projects the image of the photogram and of the mark 17 again according to parallel beams in direction of the Amici prism 26; another objective 27 which picks up the parallel beams again and makes them converge in a new real image in front of the ocular lens 29.

The other symmetric half of the apparatus is represented in a structural form in the right hand part of the figure. The rod 5 is supported by the cardan 7, whose primary axis is housed within the tubular axle 10'; this axle 10' is supported by the arm 9. The tubular axle 10' is integral to the arm 10'' which holds the axle 11'. The arm 10'', and what is held by it, may rotate around the primary axis 10' by means of the geared sector and the tangential screw 30.

The axle 11' supports the two arms 31 and 32, one integral to the other, and which may rotate around the axle 11' through the geared sector and the tangential screw 33. The arm 32 supports the ring 34, which on its turn holds the pivotable ring 35, whereon the photogram fd is mounted. The ring 35 is appropriately geared and is rotated by the tangential screw 36. The photograph fd therefore may rotate around the three axis; the primary axle 10', the secondary axle 11', the third axle formed by the geometrical axis of the ring 35.

The arm 31 supports the sleeve 37 corresponding to the one denoted by the numeral 13 and the tubular axle 15' which hold the prismatic guide 19', the prism 16' and the mark 17', is housed in the half upper portion of said sleeve.

The slide 20', which holds the prism 22', the objective 21' and the ball joint 23' for the connection to the guide rod 5, may slide along the guide 19'.

Two bearings 18'a and 18'b are secured onto the prismatic guide 19' and each respectively carries a positive optical element and a negative one, for example 18a being the negative element and 18b being the positive one. The two optical elements, in a suitable stationary position, as represented in Fig. 1, have the function of an objective whose focal length corresponds to its distance from the mark 17'. Therefore the image of any observed portion of the photograph is formed, with a constant scale, in correspondence of the mark 17'. It is well known in the art and shown in U. S. Patent No. 2,574,123, on the sleeve 37 there is rotarily mounted a tube 100 which is connected to a spherical box 101 carrying the mirror 24' and a tube 102, carrying the lens 25', extends from the box 101. A tube 103 is inserted in the tube 102 and the Amici prism 26' is housed in the tube 103. The tube 103 is also slidably inserted in the other tube 104, wherein the lens 27' is mounted. The tube 104 terminates in the box 105 similar to the one denoted by 101 and said box 105 contains the mirror 28'. The sleeve 106, carrying the ocular lens 29', extends from the box 105. The optical circuit, projecting from the sleeve 37, is substantially formed in the same manner, as shown in U. S. Patent No. 2,574,123 to Santoni, and allows the observation from the ocular lens, as the photograms to be observed are movable. According to this arrangement, the apparatus operates in the already described manner of the diagrammatically represented left hand portion, and is designed to the use of photographs executed and shot with the axes being approximately parallel.

Where, on the contrary, highly convergent exposures provided with a determined approximatively constant angle of convergence α for each camera, are used, the arrangement of the members is according to the representation in Figs. 3 and 4, limitedly to the essential operating members.

The axis of the camera ($n_2$—7) forms the angle α with the line connecting the cardans 6 and 7. This is actuated (see Fig. 1) through the rotation of the arms 32 and 31 around the axle 11', obtained by the use of the tangential screw 33. Additional small rotations, both around the axis of the camera ($n_2$—7) and around the axle 10', may eventually be effected by the tangential screws 36 and 30 respectively.

The distance $d$ of the axis of rotation defined by the member 15' from the axis of the camera ($n_2$—7) is established or adjusted by the screws 31' so as to approximately comply with the relation: $d = f \tan\alpha$, $f$ being the focal length of the shooting camera. The focal plane described by the joint 23' thus cuts the axis of rotation of the guide 19' defined by the tubular axle 15' in the nodal point $N_2$.

For the use of the instrument in these conditions, the two supports of the optical elements 18a and 18b are separated so as to slide along the guide 19'; the central portion of said guide 19', for example, has fixed thereto a support 38 carrying two levers which act in an opposite direction against the supports of said optical elements 18a and 18b in antagonism with corresponding springs (see Fig. 4). Furthermore, for example, a suitably shaped plate 39 is fixed to the slide 20' in such a way that, during the sliding of this slide 20' along the guide 19', the shaped portions of the plate 39 act on the levers carried by the support 38 so as to obtain appropriate displacements of the two optical elements 18a and 18b along the same guide 19', and this for the purpose of obtaining the formation of the partial image of the photograph in correspondence of the mark 17' with a magnification variable with the variation of the distance of the ball joint 23' from the axis of rotation 15' of the guide 19'. In particular, the shaping of the plate 39 and the positive and negative power of the two optical elements 18a and 18b may be computed, by the known technique, so as to obtain, for example, that for all the points p', q' etc. contained in the photograph in correspondence of the trace $v$ of the vertical plane, the products of the magnifications relative thereto $Ip'$, $Iq'$ etc. by the respective distances $dp'$, $dq'$ etc. measured departing from the epipolar axis (7—$N_2$) are constant and that is: $Ip' \times dp' = Iq' \times dq' =$ constant. In this way, the remarkable differences of magnification existing in the various zones of the photogram, and originated from the convergence of the axis of the exposure, are automatically eliminated at least within the tolerable limits for a good stereoscopic observation. These limits may allow the use of a single distance $d$ of the axis of rotation 15' from the axis of the camera ($n_2$—7) and of a single shaped plate 39, even when the effective value of the convergence angle is varied by a few degrees, as for example in aerial photographs, from the value α predetermined. In event that a remarkably different value α is available, a new distance $d$ may be adjusted by the screws 31' and the plate 39 may be replaced by another appropriate plate.

Always owing to the same convergence α of the exposure axis, the images of the various elements of the object being photographed, contained in different epipolar planes (planes passing through the two exposure points) are arranged on each photograph in accordance to the traces of the same planes, which converge in the nodal points. For example, for the right hand photograph $fd$ the traces of the epipolar planes $r$, $t$ and $v$ converge in the nodal point $N_2$.

As the prismatic guide 19', according to what has been stated, rotates around said point $N_2$, it automatically is located parallel to the trace containing the point of the photograph, collimated each time. On the other hand, the rotation of the guide 19' is transmitted with the pair of gears 40, the jointed axle 41 and the pair of gears 42 to the Amici prism 26' in the 1:½ ratio and this occurs simultaneously for the two cameras; consequently the partial images of the two photographs, corresponding each time to the plotted point, are located in the ocular lens 29 and 29' in the correct reciprocal orientation, which is also necessary to facilitate a good stereoscopic vision.

In Fig. 3 there is represented an upward elongation 15'' of the tubular axle 15' which supports the guide 19'. A lens 43, a diaphragm 44, wherein there is a very small central hole or the like, and a lamp 45 are housed in said elongation or extension. Moreover, in addition to the simple right prism 16' there is provided a second prism 16''; thus there is obtained a small cube formed by two right prisms fixed together in accordance with the hypotenuse surface, and this surface being semi-silvered in one of the two prisms, for example.

The lens 43 may be adjusted so as to form the image of the small hole of the diaphragm 44 in correspondence of the specular image of the mark 17' with respect to the semi-silvered surface. In this way, with the lamp 45 off, the collimation of the points of the photogram is effected with the mark 17', which will necessarily appear black on the background of the image of the photograph. Instead when the lamp 45 is turned on, the luminous image of the small hole (or of any transparent figure made on the diaphragm) will replace the mark 17' and this may be useful for particularly dark zones of the photographs.

Fig. 5 finally represents a particular embodiment of the end portion of the optical system towards the oculars, wherein, for example, the tube 46, which supports the pivotable mirror 28 and the ocular 29 and is usually located on the left hand side, is remarkably longer than the similar tube 47 holding the mirror 28' and the ocular 29', usually located on the right hand side.

By this arrangement and where the two tubes, for example, are supported by a rotary disc 49, it is possible, by rotating said disc by 180° to effect the crossing of the optical paths, as it is shown in Fig. 5, so that the right eye may observe the photograph located on the left and vice versa. This is for the purpose of usually facilitating the connection of successive photographs of a series, being in general covered by 60%.

What I claim is:

1. A mechanical projection photogrammetric plotting apparatus adapted for use with pairs of photographs having parallel and convergent axis comprising a base, a support carried by said base and being movable with respect to said base along three orthogonal directions, a ball joint on said support, telescopic guide rods cooperating with said ball joint, a pair of arm supports carried by said base each movable along three orthogonal directions with respect to said base, a cardan suspension on each of said arm supports each cooperating with a guide rod, the geometric centers of the cardan suspensions representing the shooting points, a member pivoted to each arm support, a nucleal geometric axis passing through the geometric centres of said cardan suspensions, control means for the angular movement of said member with respect to the associated support, a second arm member pivotally connected to each of said first named members on a geometric axis passing through the centre of the corresponding cardan suspension and perpendicular to said nucleal axis, a photogram-slide rotarily mounted on each of said second arm members for a corresponding photogram which results to be rotating in its own geometric plane, a sleeve carried in an adjustable manner by each of said arm members, a guide parallel to said photogram plane and rotarily engaged on each of said sleeves on a rotational geometric axis passing through said nucleal axis in a point outside the geometric segment defined on said nucleal axis by said centres of the cardan suspensions, said rotational geometric axis being perpendicular to the photogram geometric plane and to the ideal geometric plane representing the camera focal plane, for convergent shooting, said focal plane cutting said nucleal axis in a nodal point at least near the meeting point of said nodal axis with said rotational axis of said guide; an exploration slide slidable on each of said guides; a ball link between each of said exploration slides and the extensible end of the corresponding guide rod whereby the exploration slide is moved and the guide rotates according to a plane parallel to the focal plane and to the photogram plane locating each guide parallel to the mark, on the photogram, of the nucleal geometric plane passing through the nucleal axis and through the point each time collimated an optical collimation system for each photogram, involving elements arranged on said guide, elements arranged on the sleeve, elements arranged on linked means ending in the ocular lens, and an Amici prism rotarily mounted on said linked means; and a rotary drive with a 1:½ ratio between each of said guides and the corresponding Amici prism.

2. A mechanical projection photogrammetric plotting apparatus adapted for use with pairs of photographs having parallel and convergent axis comprising a base, a support carried by said base and being movable with respect to said base along three orthogonal directions, a ball joint on said support, telescopic guide rods cooperating with said ball joint, a pair of arm supports carried by said base each movable along three orthogonal directions with respect to said base, a cardan suspension on each of said arm supports each cooperating with a guide rod, the geometric centers of the cardan suspensions representing the shooting points, a member pivoted to each arm support, a nucleal geometric axis passing through the geometric centres of said cardan suspensions, control means for the angular movement of said member with respect to the associated support, a second arm member pivotally connected to each of said first named members on a geometric axis passing through the centre of the corresponding cardan suspension and perpendicular to said nucleal axis, a photogram-slide rotarily mounted on each of said second arm members for a corresponding photogram which results to be rotating in its own geometric plane, a sleeve carried in an adjustable manner by each of said arm members, a guide parallel to said photogram plane and rotarily engaged on each of said sleeves on a rotational geometric axis passing through said nucleal axis in a point outside the geometric segment defined on said nucleal axis by said centres of the cardan suspensions, said rotational geometric axis being perpendicular to the photogram geometric plane and to the ideal geometric plane representing the camera focal plane, for convergent shooting, said focal plane cutting said nucleal axis in a nodal point at least near the meeting point of said nodal axis with said rotational axis of said guide; an exploration slide slidable on each of said guides; a ball link between each of said exploration slides and the extensible end of the corresponding guide rod whereby the exploration slide is moved and the guide rotates according to a plane parallel to the focal plane and to the photogram plane locating each guide parallel to the mark on the photogram of the nucleal geometric plane passing through the nucleal axis and through the point each time collimated, an optical collimation system including: a first right prism and an objective lens supported by said exploration slide, the right angle prism being arranged in correspondence of the ball link connection of the exploration slide, to obtain the deflection of the optical collimation axis initially normal to the photogram, in a direction parallel to said guide for said exploration slide towards the objective lens, the focal length of said objective lens being equal to its optical distance from the photogram to project the image of the photographic point located on the axis according to a beam of rays parallel to said guide; two optical elements, a negative one and a positive one, arranged on the optical axis parallel to the guide; a second right angle prism located in correspondence of the rotational axis of said guide, apt to deflect the optical axis along this rotational axis; a collimation mark in the length of the optical axis parallel to the guide, in a stationary position near the second right angle prism; said two, positive and negative, elements forming an objective apt to form on the geometric plane of said mark, a partial image of the photogram; a differentially pivotable mirror, arranged in a spherical box forming a joggle linkage between a first tube independently pivotal on the same rotational axis of the guide, and a second tube, an objective lens mounted on said second tube; an Amici prism mounted on a third tube rotating with respect to the second tube; a drive formed by shafts parallel to said first and said second tubes and joined by a universal link which transmits to said third tube rotations equal to the half of the rotations of said guide; an objective lens carried by a fourth tube axially slidable with respect to the third tube; a mirror differentially pivotable in a spherical box forming a joggle connection between said fourth tube and a fifth tube; an ocular lens carried by said fifth tube, the two objective lenses being arranged before and after the Amici prism having such a focal length as to bring, into the field of the ocular lens, the partial image of the photogram and of the mark, though varying the distance between the two mirrors.

References Cited in the file of this patent

UNITED STATES PATENTS

| | | |
|---|---|---|
| 2,057,921 | Santoni | Oct. 20, 1936 |
| 2,574,123 | Santoni | Nov. 6, 1951 |